United States Patent
Takada et al.

(10) Patent No.: US 9,695,728 B2
(45) Date of Patent: Jul. 4, 2017

(54) CONDENSED WATER TREATMENT DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Noriyuki Takada, Susono (JP); Takeshi Hashizume, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/897,513

(22) PCT Filed: Jun. 28, 2013

(86) PCT No.: PCT/JP2013/067877
§ 371 (c)(1),
(2) Date: Dec. 10, 2015

(87) PCT Pub. No.: WO2014/207917
PCT Pub. Date: Dec. 31, 2014

(65) Prior Publication Data
US 2016/0138451 A1 May 19, 2016

(51) Int. Cl.
| F01N 3/00 | (2006.01) |
|---|---|
| F01N 3/02 | (2006.01) |
| F01N 3/10 | (2006.01) |
| F01N 3/20 | (2006.01) |
| F02M 26/35 | (2016.01) |
| F01N 3/08 | (2006.01) |
| F02M 26/00 | (2016.01) |
| F02B 37/00 | (2006.01) |

(52) U.S. Cl.
CPC ............ F01N 3/208 (2013.01); F01N 3/005 (2013.01); F01N 3/08 (2013.01); F01N 3/2066 (2013.01);
(Continued)

(58) Field of Classification Search
CPC ............ F01N 2610/02; F01N 2610/03; F01N 2610/146; F01N 3/005; F01N 3/08;
(Continued)

(56) References Cited

U.S. PATENT DOCUMENTS 5,121,602 A * 6/1992 McCorvey ............. F01N 3/005
261/84
6,164,063 A * 12/2000 Mendler ............... F01N 3/2882
60/274

(Continued)

FOREIGN PATENT DOCUMENTS

| JP | 10-318049 | 12/1998 |
| JP | 2000-27715 | 1/2000 |

(Continued)

*Primary Examiner* — Phutthiwat Wongwian
*Assistant Examiner* — Diem Tran
(74) *Attorney, Agent, or Firm* — Finnegan, Henderson, Farabow, Garrett & Dunner, LLP

(57) ABSTRACT

The condensed water treatment device obtains (S1) the storage water quantity (QW) of a condensed water tank, and drains (S4) condensed water in the condensed water tank when the storage water quantity (QW) is larger than a threshold value (tu) and also urea water is supplied to an exhaust passage for a selective-reduction type NOx catalyst. Thereby, the condensed water is neutralized and then drained to the outside of an internal combustion engine through the exhaust passage.

9 Claims, 7 Drawing Sheets

(52) U.S. Cl.
CPC ............ *F02M 26/00* (2016.02); *F02M 26/35* (2016.02); *F01N 2610/02* (2013.01); *F01N 2610/03* (2013.01); *F01N 2610/146* (2013.01); *F01N 2900/0416* (2013.01); *F02B 37/00* (2013.01); *Y02T 10/24* (2013.01)

(58) Field of Classification Search
CPC ................... F01N 3/2066; F01N 3/208; F01N 2900/0416; F01N 3/02; F02M 26/00; F02M 26/35; Y02T 10/24; F02B 37/00
See application file for complete search history.

(56) References Cited

U.S. PATENT DOCUMENTS

| | | | | |
|---|---|---|---|---|
| 7,302,795 B2* | 12/2007 | Vetrovec | ................... | F01N 5/02 60/274 |
| 8,104,456 B2* | 1/2012 | Yacoub | ................. | F01N 13/009 123/25 A |
| 8,250,856 B2* | 8/2012 | Ohashi | ................... | B01D 53/90 60/286 |
| 2010/0031645 A1* | 2/2010 | Bidner | ...................... | F01N 1/02 60/309 |
| 2014/0130483 A1 | 5/2014 | Miyake | | |

FOREIGN PATENT DOCUMENTS

| | | |
|---|---|---|
| JP | 2004-156471 A | 6/2004 |
| JP | 2007-154795 | 6/2007 |
| JP | 2010-43585 | 2/2010 |
| JP | 2013-122225 | 6/2013 |
| JP | 2013-124563 | 6/2013 |
| WO | WO2012/164713 | 12/2012 |

\* cited by examiner

CONDENSED WATER TREATMENT DEVICE FOR INTERNAL COMBUSTION ENGINE

CROSS-REFERENCE TO RELATED APPLICATIONS

This application is a national phase application of International Application No. PCT/JP2013/067877, filed Jun. 28, 2013, the content of which is incorporated herein by reference.

TECHNICAL FIELD

The present invention relates to a condensed water treatment device for an internal combustion engine, where condensed water generated in an exhaust system of the internal combustion engine is treated.

BACKGROUND ART

As a condensed water treatment device for an internal combustion engine, known is the one which stores, in a condensed tank, condensed water generated in an EGR cooler, and injects the condensed water to an intake passage when the storage water quantity stored in the condensed water tank reaches a predetermined quantity (Patent Literature 1). The condensed water supplied to the intake passage is led into a cylinder with intake gas to vaporize. Thereby, the combustion temperature is suppressed. As a result of that, the generation quantity of NOx because of combustion is suppressed. In addition, as other literatures of prior art relating to the present invention, there are Patent Literatures 2 to 4.

CITATION LIST

Patent Literature

PTL1: JP-A-H10-318049
PTL2: JP-A-2010-43585
PTL3: JP-A-2007-154795
PTL4: JP-A-2000-27715

SUMMARY OF INVENTION

Technical Problem

The condensed water treatment device like the one disclosed in the Patent Literature 1 is not capable of supplying unlimitedly the condensed water to the internal combustion engine. Due to this, in a case where the storage water quantity of the condensed water tank has become overmuch, it is necessary to drain the condensed water stored in the condensed water tank to an outside of the internal combustion engine to decrease the storage water quantity of the condensed water tank. However, it is preferable to suppress as much as possible that condensed water having high acidity is drained to the outside of the internal combustion engine.

Then, the present invention aims to provide a condensed water treatment device for an internal combustion engine, the condensed water treatment device having ability to suppress that condensed water having high acidity is drained to the outside of the internal combustion engine.

Solution to Problem

A condensed water treatment device for an internal combustion engine as one aspect of the present invention is A condensed water treatment device for an internal combustion engine, the condensed water treatment device being applied to the internal combustion engine comprising: a selective-reduction type NOx catalyst which is provided on an exhaust passage to reduce NOx to purify exhaust gas by ammonia; and an additive supplying valve which supplies an additive which is ammonia or a precursor of ammonia to the exhaust passage at an upstream side of the NOx catalyst, wherein the condensed water treatment device comprises: a condensed water tank which stores condensed water generated in an exhaust system of the internal combustion engine; a drainage passage which connects the condensed water tank and the exhaust passage; a switching valve which switches a state of the drainage passage between close and open; and a drainage controlling device which is configured to control the switching valve, so that the condensed water is drained to the exhaust passage via the drainage passage while the additive is being supplied to the exhaust passage via the additive supplying valve.

When the additive which is ammonia or a precursor of ammonia is supplied to the exhaust passage, the exhaust passage reaches a state that ammonia exists therein. According to the condensed water treatment device of the present invention, condensed water stored in the condensed water tank is drained to the exhaust passage via the drainage passage while such an additive is supplied to the exhaust passage. Due to this, the condensed water drained to the exhaust passage and ammonia existing in the exhaust passage are mixed and neutralized. Thereby, the pH of condensed water drained to the exhaust passage increases and the acidity of the condensed water is reduced. Accordingly, the condensed water having reduced acidity is drained to the outside of the internal combustion engine through the exhaust passage whereby it is possible to suppress that condensed water having high acidity is drained to the outside of the internal combustion engine.

As one embodiment of the condensed water treatment device of the present invention, a connecting position where the drainage passage and the exhaust passage are connected with each other may be positioned at a downstream side of the additive supplying valve. According to this embodiment, it is possible to suppress that the additive supplying valve is exposed to the condensed water in drainage time of condensed water to the exhaust passage. Thereby, it is possible to suppress corrosion of the additive supplying valve which is caused by the additive supplying valve exposed to the condensed water.

As one embodiment of the condensed water treatment device of the present invention, a connecting position where the drainage passage and the exhaust passage are connected with each other may be positioned at an upstream side of the NOx catalyst, and the drainage controlling device may be configured to calculate a drainage quantity of the condensed water according to temperature of the NOx catalyst. According to this embodiment, since the drainage of condensed water is executed according to the temperature of the NOx catalyst, it is possible to keep the temperature of the NOx catalyst within an appropriate range.

In this embodiment, the drainage controlling device may be configured to calculate the drainage quantity within a limitation which does not exceed an upper limit set so as to become larger as the temperature of the NOx catalyst is higher. In this case, it is possible to suppress excessive increase and excessive decrease of the temperature of the NOx catalyst. Thereby, it is possible to suppress excessive decrease of activity of the NOx catalyst, which is caused by the drainage of condensed water.

As one embodiment of the condensed water treatment device of the present invention, the condensed water treatment device may further comprise an additive quantity increasing device which is configured to increase supply quantity of the additive to the exhaust passage so that the supply quantity of the additive to the exhaust passage to the exhaust passage in drainage time of condensed water is increased in comparison with the supply quantity to the exhaust passage in non-drainage time of condensed water. According to this embodiment, it is possible to suppress that ammonia which should be held by the NOx catalyst becomes insufficient by being used for the neutralization of the condensed water. Thereby, it is possible to neutralize condensed water without impairing the original purpose of use of the additive.

In the above embodiment, the additive quantity increasing device may be configured to increase the supply quantity of the additive based on drainage quantity of the condensed water drained to the exhaust passage and pH of the condensed water stored in the condensed water tank. The quantity of additive necessary for neutralization of condensed water changes depending on the drainage quantity of the condensed water and the pH of the condensed water. Accordingly, it is possible to suppress excessive increase of additive quantity by increasing the supply quantity of the additive based on the drainage of the condensed water and the pH of the condensed water.

Further, in the above embodiment, the condensed water treatment device may further comprise an additive holding portion which is connected to the additive supplying valve to hold the additive, wherein the additive quantity increasing device may be configured to inhibit increase of supply quantity of the additive in a case where holding quantity of the additive in the additive holding position is equal to, or less than a predetermined value, and the predetermined value may be set so as to become smaller as pH of the condensed water stored in the condensed water tank is smaller. As the pH of condensed water is smaller, the acidity becomes higher and the necessity to neutralize the condensed water by increase of additive quantity becomes higher. That is, as the pH of the condensed water is smaller, it is more preferable that the increase of additive quantity is not inhibited, but continued. However, the original purpose of use of the additive is the supply to the NOx catalyst. Accordingly, in a case where the holding quantity of the additive lowers, the original purpose of use should be prioritized. Then, a predetermined value for inhibiting increase of the additive quantity is set so as to become smaller as the pH of the condensed water is smaller, whereby, it is possible to satisfy the necessity of neutralization of the condensed water as much as possible while keeping the original purpose of use of the additive.

In a case where the increase of additive quantity is inhibited, it is preferable to drain condensed water by the following embodiment. That is, the internal combustion engine may further comprise: an EGR passage which takes out the exhaust gas from the exhaust passage at a downstream of the NOx catalyst and leads the exhaust gas to an intake system; an EGR cooler which is provided on the EGR passage; and a back pressure controlling valve which is provided at a downstream side of a connecting position where the drainage passage and the exhaust passage are connected with each other and also at a downstream side of a position where the EGR passage takes out the exhaust gas, and is capable of narrowing down a flow path of the exhaust passage, wherein the condensed water tank may store condensed water generated in the EGR cooler, as the condensed water generated in the exhaust system, and the drainage controlling device may be configured to operate the back pressure controlling valve so that the condensed water is drained to the exhaust passage in a state that the flow path of the exhaust passage is narrowed down, in a case where the increase of the supply quantity of the additive is inhibited. Thereby, in a case where the increase of additive quantity is inhibited, condensed water is drained to the exhaust passage in a state that a flow path is narrowed down at the downstream side of a position where the EGR passage takes out the exhaust gas. Due to this, the ratio of condensed water taken into the EGR passage increases. Accordingly, it is possible to reduce the drainage quantity of condensed water drained to the outside through the exhaust passage.

In the above case, the internal combustion engine may further comprise an EGR valve provided on the EGR passage, and the drainage controlling device may be configured to operate the EGR valve so that the EGR passage is closed. Thereby, a part of condensed water drained to the exhaust passage circulate along this route: the exhaust passage→the NOx catalyst→the EGR passage→the EGR cooler→the condensed water tank→the drainage passage→the exhaust passage. Since condensed water is circulated in this way, it is possible to prevent the condensed water from inflowing into an unexpected path such as the intake passage. Due to this, it is possible to prevent generation of corrosion accompanying the inflow of the condensed water.

BRIEF DESCRIPTION OF DRAWINGS

FIG. 1 is a diagram showing a whole configuration of an internal combustion engine which a condensed water treatment device according to one embodiment of the present invention is applied to.

DESCRIPTION OF EMBODIMENTS

A First Embodiment

Figure 1:
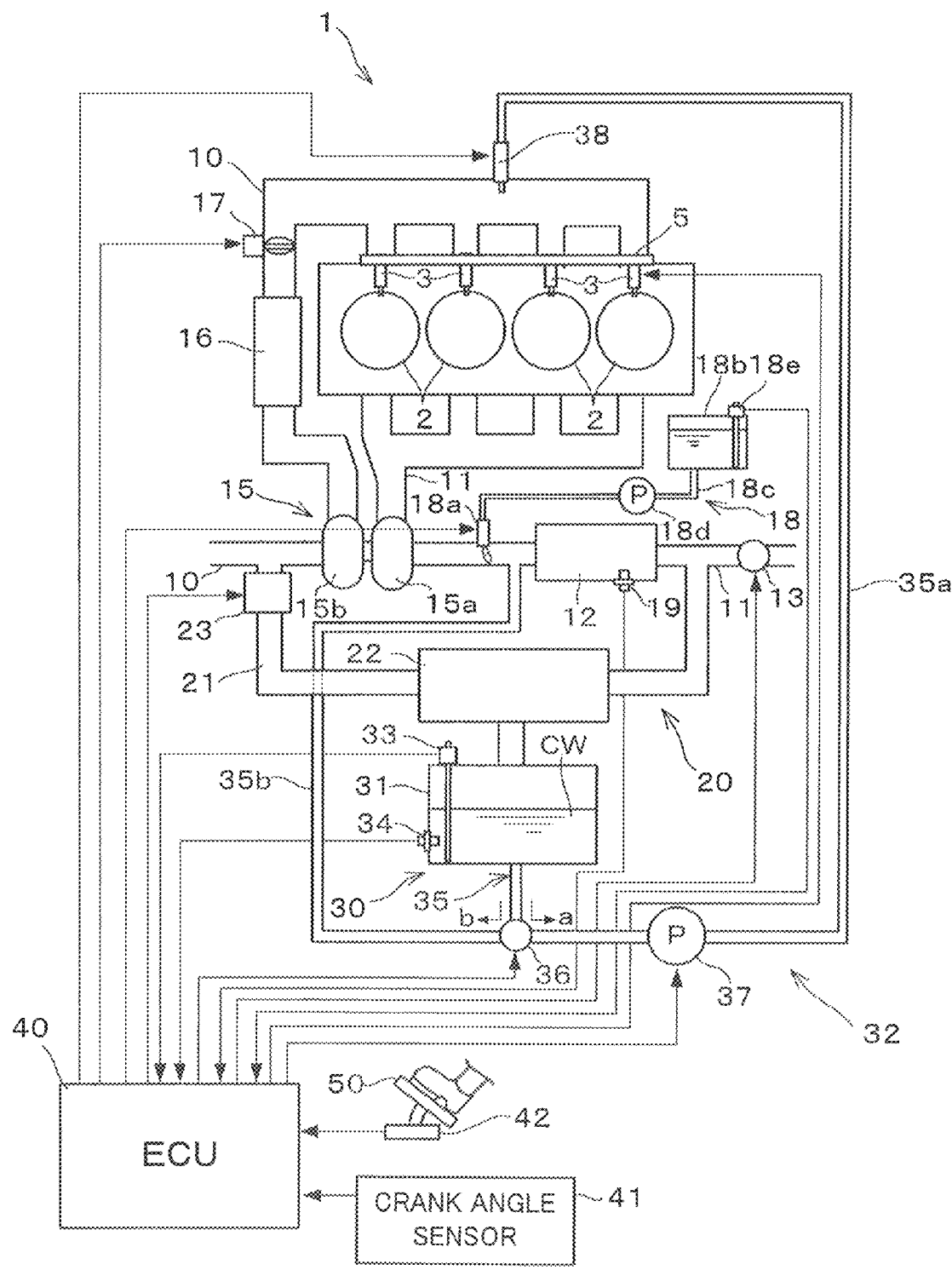

As shown in FIG. 1, an internal combustion engine 1 is configured as a four-cylinder type in line diesel engine in which four cylinders 2 are arranged along a straight line. The internal combustion engine 1 is mounted as a drive source for traveling of, for example, a car. The internal combustion engine 1 is provided, for each cylinder 2, with a fuel injection valve 3 for supplying fuel into each cylinder 2. Each fuel injection valve 3 is connected with a common rail 5 where fuel is forcibly fed, and fuel is supplied to each fuel injection valve 3 via the common rail 5. An intake passage 10 and an exhaust passage 11 are connected with each cylinder 2.

Air led into the intake passage 10 is filled in each cylinder 2 at a suction stroke. Fuel injected from the fuel injection valve 3 to the cylinder 2 is self-ignited and combusted at a compression stroke. Exhaust gas after the combustion is led into the exhaust passage 11. The exhaust gas led to the exhaust passage 11 is drained to the atmospheric air after NOx is reduced by a selective-reduction type NOx catalyst 12. At the upstream side of the NOx catalyst 12, a turbine 15a of a turbo charger 15 is provided. At the downstream side of the NOx catalyst 12, provided is a back pressure controlling valve 13 capable of narrowing down a flow path of the exhaust passage 11. As well known, the flow path of the exhaust passage 11 is narrowed down by the back pressure controlling valve 13 whereby the back pressure of the internal combustion engine 1 increases and pumping loss increases. Thereby, it is possible to increase a braking force in time of deceleration. The intake passage 10 is provided with a compressor 15b of the turbo charger 15, an intercooler 16 cooling air pressured by the compressor 15b, and a throttle valve 17 adjusting the flow rate of intake gas.

The internal combustion engine 1 is provided with an additive supplying device 18 for supplying urea water, which is a precursor of ammonia, as an additive to the NOx catalyst 12. The additive supplying device 18 comprises: an additive supplying valve 18a which supplies urea water to the exhaust passage 11 at the upstream side of the NOx catalyst 12; a urea water tank 18b as an additive holding portion which stores urea water; a supplying passage 18c which connects the additive supplying valve 18a and the urea water tank 18b; and an electric pump 18d which pressures urea water in the supplying passage 18c. It is possible to control the supply quantity of urea water by controlling a valve opening period of the additive supplying valve 18a. The urea water tank 18b is provided with a water level sensor 18e which outputs a signal according to the storage water quantity (the water level), that is, the holding quantity of urea water. When urea water is supplied at the upstream side of the NOx catalyst 12, ammonia is generated by the hydrolysis reaction, the ammonia is held by the NOx catalyst 12. The ammonia held by the NOx catalyst 12 functions as a reducing agent whereby NOx is reduced and the exhaust gas is purified. The NOx catalyst 12 is provided with a temperature sensor 19 which outputs a signal according to the temperature of the NOx catalyst 12.

The internal combustion engine 1 is provided with an EGR device 20 which executes the EGR (Exhaust Gas Recirculation) that a part of exhaust gas is recirculated to an intake system for reduction of NOx and improvement of fuel economy. The EGR device 20 comprises: an EGR passage 21 connecting the exhaust passage 11 and the intake passage 10; an EGR cooler 22 cooling the exhaust gas in the EGR passage 21; and an EGR valve 23 for adjusting the flow rate of exhaust gas to be led to the intake passage 10 (the EGR gas). The EGR passage 21 has an exhaust side end portion opening at an area of the downstream side of the NOx catalyst 12 and also the upstream side of the back pressure controlling valve 13, and an intake side end portion opening at the upstream side of the compressor 15b. As well known, the EGR cooler 22 uses cooling water in the internal combustion engine 1 as a refrigerant, and decreases the temperature of the EGR gas by heat exchange between the refrigerant and warm exhaust gas. The temperature of the EGR gas decreases whereby moisture included in the EGR gas is condensed. Due to this, condensed water is generated in the EGR cooler 22. In addition, the temperature of the EGR gas in the EGR passage 21 decreases whereby condensed water is also generated in the EGR passage 21.

The internal combustion engine 1 is provided with a condensed water treatment device 30 for collecting and treating condensed water generated in the exhaust system such as the EGR cooler 22 and the EGR passage 21. The condensed water treatment device 30 comprises: a condensed water tank 31 which stores condensed water CW; and a supplying-draining water mechanism 32 which supplies to the intake system of the internal combustion engine 1 or drains to the exhaust passage 11, the condensed water CW stored in the condensed water tank 31. The condensed water tank 31 is provided with a water level sensor 33 which outputs a signal according to the storage water quantity (the water level) of the condensed water CW; and a pH sensor 34 which outputs a signal according to the pH of the condensed water CW stored. The supplying-draining water mechanism 32 has a derivation path 35 which takes out the condensed water CW from the condensed water tank 31. The derivation path 35 is separated into a supply passage 35a connected with the intake passage 10 and a drainage passage 35b connected with the exhaust passage 11. At the separating position of the derivation path 35, a switching valve 36 is provided. The switching valve 36 is allowed to operate between: a supply position where the drainage passage 35b is closed and the supply passage 35a is opened to lead the condensed water in a direction a; and a drainage position where the supply passage 35a is closed and the drainage passage 35b is opened to lead the condensed water in a direction b. By the operation of the switching valve 36, it is possible to switch between supply of condensed water to the intake system and drainage of condensed water to the exhaust system.

The supply passage 35a is provided with an electric pump 37 and an injection valve 38 which injects and supplies condensed water pressured by the pump 37 to the intake passage 10. It is possible to control the supply quantity of condensed water by control of a valve opening period of the injection valve 38. The drainage passage 35b is connected with the exhaust passage 11 between the additive supplying valve 18a and the NOx catalyst 12. The explanation using an illustration is omitted, but the drainage passage 35b is arranged so that in a case where the drainage passage 35b is opened, the condensed water is drained to the exhaust passage 11 by gravity. A connecting position where the drainage passage 35b and the exhaust passage 11 are connected with each other is set on the downstream side of the additive supplying valve 18a. Thereby, it is possible to suppress that the additive supplying valve 18a is exposed to the condensed water when the condensed water is drained to the exhaust passage 11. Thereby, it is possible to suppress corrosion of the additive supplying valve 18a, the corrosion caused by the exposure of the additive supplying valve 18a to the condensed water. Further, since the connecting position is set at the upstream side of the NOx catalyst 12, the drained condensed water can be used for adjusting the temperature of the NOx catalyst 12.

The internal combustion engine 1 is provided with an engine control unit (ECU) 40 configured as a computer which controls each portion of the internal combustion engine 1. The ECU 40 executes a main motion control for controlling the fuel injection quantity and the injection timing of the internal combustion engine 1 by operating the fuel injection valve 3. The ECU 40 is also used to control of the EGR device 20 and the condensed water treatment device 30. Further, the ECU 40 operates the additive supplying valve 18a so that a state that ammonia is held by the NOx catalyst 12 is kept, whereby the ECU 40 executes continuously the supply of urea water except a special condition. A part of ammonia generated by the supply of urea water is held by the NOx catalyst 12, and a part of the remaining goes through the NOx catalyst 12. The supply quantity of the urea water is set based on various conditions such as the temperature of the NOx catalyst 12 and the holing quantity of ammonia.

Signals from a lot of sensors are inputted to the ECU 40, the sensors detecting various kinds of physical amounts for grasping the operating state of the internal combustion engine 1. For example, as sensors relating to the present invention, provided to the internal combustion engine 1 are a crank angle sensor 41 which outputs a signal according to a crank angle of the internal combustion engine 1, an accelerator opening degree sensor 42 which outputs a signal according to a depression amount of an accelerator pedal 50 provided to the internal combustion engine 1 (the accelerator opening degree), and the like. The signals outputted from those sensors are inputted to the ECU 40. Further, the signals outputted from the water level sensor 18e, the temperature sensor 19, the water level sensor 33, and the pH sensor 34 are also inputted to the ECU 40 respectively.

Figure 2:
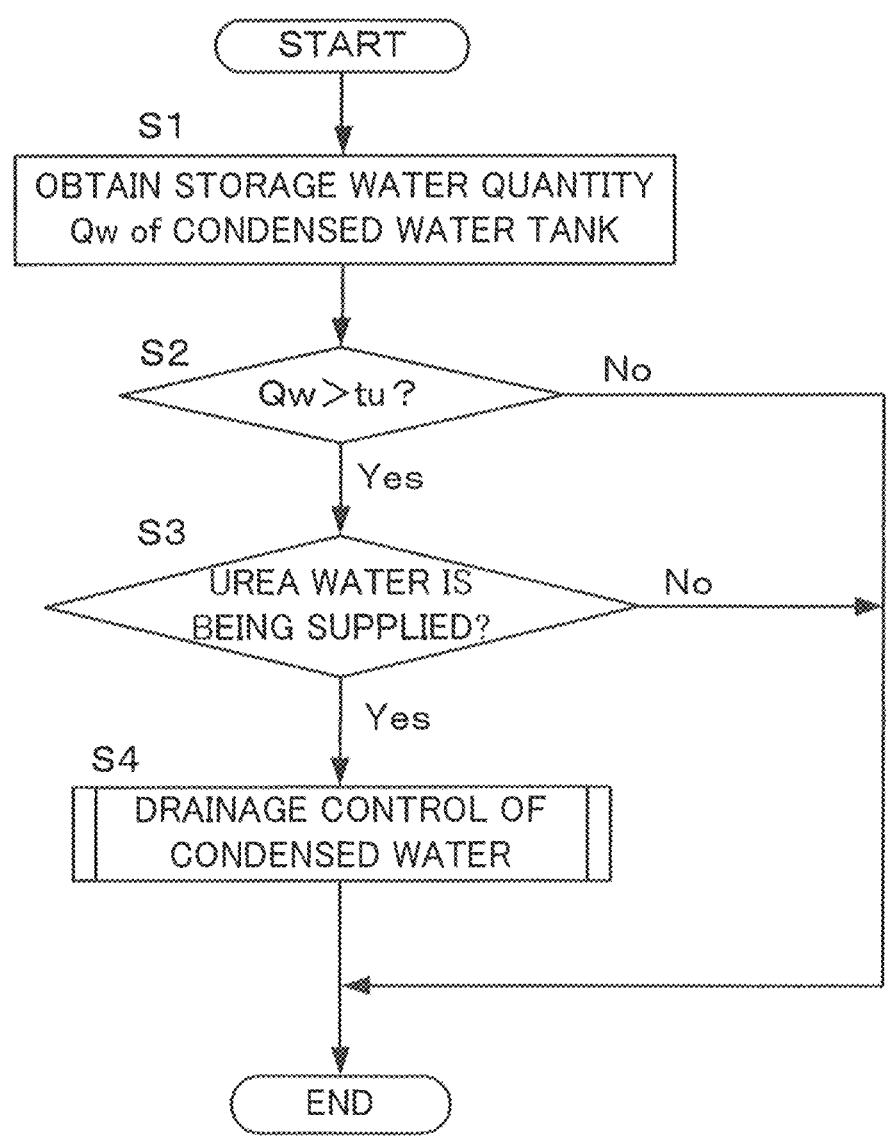
FIG. 2 is a flow chart showing one example of a main routine of a control routine of a first embodiment.
Figure 3:
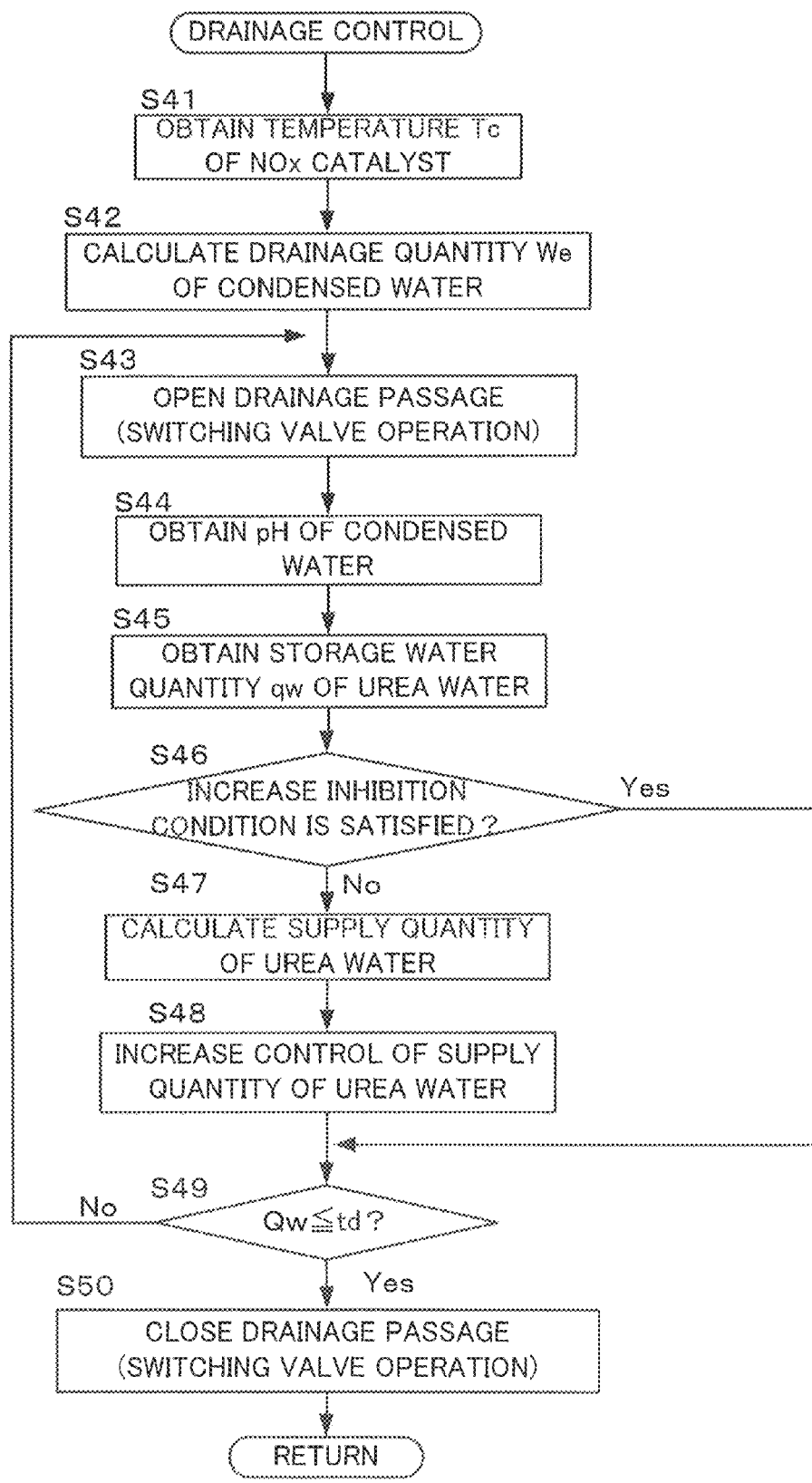
FIG. 3 is a flow chart showing one example of a sub routine of FIG. 2.

The present embodiment is characterized by drainage control of condensed water which the ECU 40 executes in a case where the storage water quantity of the condensed water tank 31 has become overmuch. Computer programs for executing control routines shown in FIGS. 2 and 3 are stored in the ECU 40 and read out as appropriate to be executed at predetermined intervals repeatedly. In step S1, the ECU 40 refers to the signal outputted from the water level sensor 33 to obtain the storage water quantity Qw of the condensed water tank 31. Alternatively, instead of use of the water level sensor 33, the storage water quantity Qw of the condensed water tank 31 can be estimated based on an estimation result which is obtained by estimating the generation quantity of condensed water based on the operating state of the internal combustion engine 1 and temperature information such as an outside air temperature and a cooling water temperature. In step S2, the ECU 40 determines whether the storage water quantity Qw is larger than a threshold value tu. This threshold value tu is a threshold value for determining the storage water quantity is overmuch. For example, a value corresponding to 90% of an acceptable quantity of the condensed water tank 31 is set as the threshold value tu. In a case where the storage water quantity Qw is larger than the threshold value tu, the ECU 40 goes to step S3. In a case where the storage water quantity Qw is equal to or less than the threshold value tu, the ECU 40 skips the following steps and ends the routine of this time.

In step S3, the ECU 40 determines whether urea water is being supplied, that is, whether urea water is being supplied to the exhaust passage 11 via the additive supplying valve 18a. The ECU 40 makes this determination by grasping a progress status of control to the additive supplying device 18, the control being executed in parallel with the control routines of FIGS. 2 and 3. In a case where the urea water is being supplied, the ECU 40 goes to step S4 to execute the drainage control of condensed water. In a case where the urea water is not being supplied, the ECU 40 skips step S4 and ends the routine of this time.

In step S41 of FIG. 3, the ECU 40 refers to the signal outputted from the temperature sensor 19 to obtain the temperature Tc of the NOx catalyst 12. In step S42, the ECU 40 calculates a drainage quantity We of condensed water according to the temperature Tc of the NOx catalyst 12. If the condensed water is drained unlimitedly, the temperature Tc of the NOx catalyst 12 lowers excessively whereby there is a probability that the NOx catalyst 12 reaches an inactive state. On the other hand, in a situation that the NOx catalyst Tc is heated extremely due to execution of the PM regeneration control, the post injection and the like which accompany increase of exhaust gas temperature, it is possible to decrease the temperature Tc of the NOx catalyst 12 by the drainage of condensed water.

Figure 4:
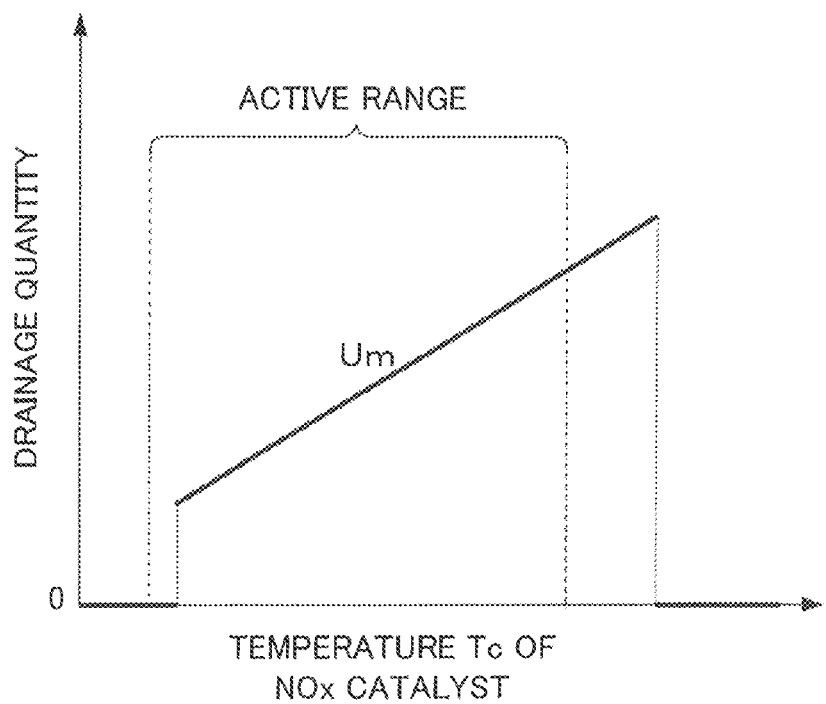
FIG. 4 is a diagram for explaining a calculation method of drainage quantity of the condensed water.

Then, in order to keep the temperature Tc of the NOx catalyst 12 in an appropriate range where the NOx catalyst 12 can activate, an upper limit Um of the drainage quantity We is set according to the temperature Tc of the NOx catalyst 12 as shown in FIG. 4. The ECU 40 calculates the drainage quantity We so that the drainage quantity We does not exceed the upper limit Um. The upper limit Um is set so as to become larger as the temperature Tc of the NOx catalyst 12 is higher. Due to this, it is possible to suppress excessive increase and excessive decrease of the temperature Tc of the NOx catalyst 12 whereby it is possible to suppress excessive decrease of activity of the NOx catalyst 12, the excessive decrease being caused by the drainage of condensed water.

A concrete calculation method of the drainage quantity We of condensed water is as follows. First, a provisional value of the drainage quantity of condensed water is obtained. This provisional value is a value less than the threshold value tu, for example, a drainage quantity required to decrease the storage water quantity Qw up to 70% of the acceptable quantity. Next, the upper limit Um corresponding to the temperature Tc of the NOx catalyst 12 is specified. Next, the upper limit Um specified and the provisional value are compared with each other. In a case where the provisional value exceeds the upper limit Um, the upper limit Um is calculated as the drainage quantity We. In a case where the provisional value is equal to or less than the upper limit Um, the provisional value is calculated as the drainage quantity We. Thereby, the drainage quantity We is calculated within a limit which does not exceed the upper limit Um. In a case of a region where the upper limit Um is set to zero, the drainage of condensed water is not executed and execution of this routine is stopped.

In step S43, the ECU 40 operates the switching valve 36 to the drainage position so that the drainage passage 35b is opened. Thereby, the drainage of condensed water to the exhaust passage 11 starts. In step S44, the ECU 40 refers to the signal outputted from the pH sensor 34 to obtain the pH of condensed water. In step S45, the ECU 40 refers to the signal outputted from the water level sensor 18e to obtain the storage water quantity qw of urea water.

Figure 5:
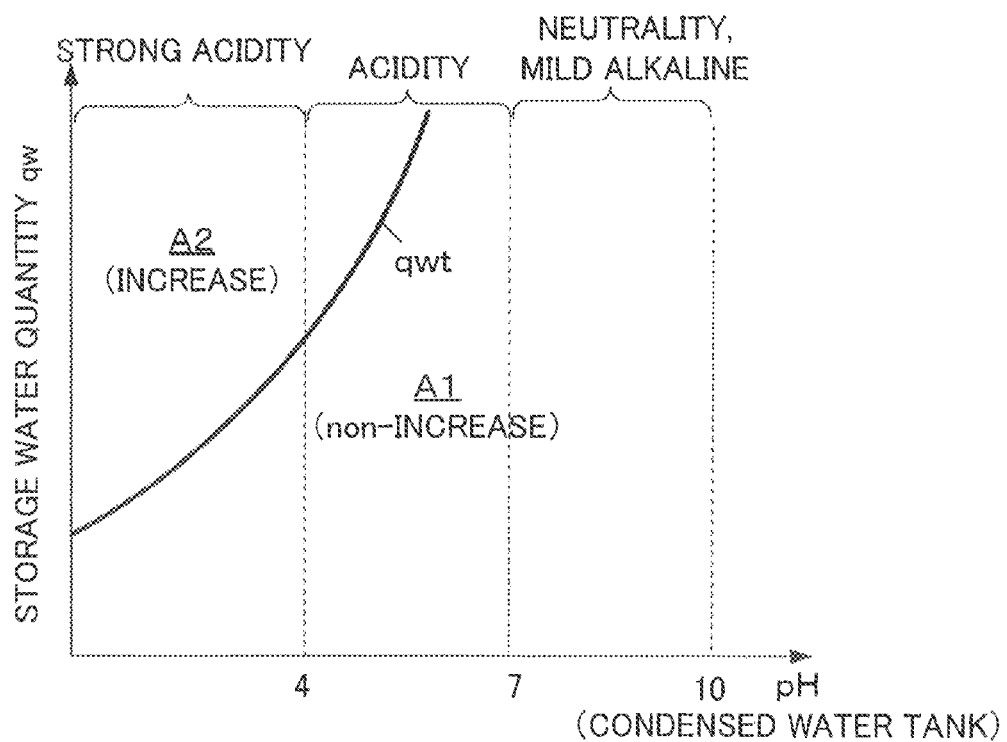
FIG. 5 is a diagram showing one example of a setting method of a predetermined value for inhibiting increase of urea water quantity.

In step S46, the ECU 40 determines whether an increase inhibition condition is satisfied based on the pH of the condensed water and the storage water quantity qw of the urea water. The increase inhibition condition is a condition for inhibiting an increase control mentioned later where supply quantity of urea water is increased so as to be larger than the supply quantity in non-drainage time of condensed water. It is determined whether the increase inhibition condition is satisfied or not, as shown in FIG. 5, based on whether or not the storage water quantity qw of urea water is equal to or less than a predetermined value qwt which is set according to the pH of the condensed water. As shown in FIG. 5, the predetermined value qwt is set so as to become smaller as the pH of condensed water is smaller. In a region A1 where the storage water quantity qw of urea water is equal to or less than the predetermined value qwt, the increase inhibition condition is satisfied whereby the increase of urea water quantity is inhibited. On the other hand, in a region A2 where the storage water quantity qw of urea water is larger than the predetermined value qwt, the increase inhibition condition is not satisfied whereby the increase of urea water quantity is executed. In a case where the increase inhibition condition is not satisfied, the ECU 40 executes the increase control in steps S47 and S48, and in a case where the increase inhibition condition is satisfied, the ECU 40 skips the increase control and goes to step S49.

In addition, in a case the storage water quantity qw is included in the region A1 shown in FIG. 5 and also condensed water stored in the condensed water tank 31 is neutral or mildly alkaline, the necessity to neutralize the condensed water is low. Due to this, the ECU 40 can stop the execution of the present control routine and can drain the condensed water to the exhaust passage 10 in time of stop of the internal combustion engine 1 or the like regardless of whether the urea water is being supplied or not.

In step S47, the ECU 40 calculates a post-increase supply quantity of urea water based on the drainage quantity We of condensed water and the pH of condensed water. A quantity of ammonia necessary to neutralize the condensed water changes depending on the drainage quantity We of condensed water and the pH of condensed water. That is, as the drainage quantity We of condensed water is larger, or the pH of condensed water is higher, the quantity of ammonia required to neutralize the condensed water becomes larger. Accordingly, it is possible to obtain an appropriate value of the supply quantity of urea water by calculating the post-increase supply quantity of urea water based on the drainage quantity of condensed water We and the pH of condensed water. Therefore, it is possible to suppress excessive increase of urea water quantity.

In step S48, the ECU 40 operates the additive supplying valve 18a so that urea water having supply quantity calculated in the step S47 is supplied to the exhaust passage 11. Thereby, the supply quantity of urea water increases so as to be larger than supply quantity of urea water which should be supplied for an original purpose of use, that is replenishment of ammonia to the NOx catalyst 12. Accordingly, it is possible to suppress that ammonia which should be held in the NOx catalyst 12 becomes insufficient by being used for neutralizing the condensed water. Therefore, it is possible to neutralize the condensed water without impairing the original purpose of use of the additive.

In step S49, the ECU 40 determines whether the storage water quantity Qw of the condensed water tank 31 has reached a drainage ending value td. The drainage ending value td means a storage water quantity of the condensed water tank 31 remaining after the drainage of condensed water having a quantity corresponding to the drainage quantity We calculated in the step S42. Accordingly, in a case where the storage water quantity Qw exceeds the ending value td, the quantity of drained condensed water has not yet reached by this control, the drainage quantity We of condensed water which should be drained. Therefore, the ECU 40 returns to step S43 and continues drainage of condensed water. On the other hand, in a case where the storage water quantity Qw is equal to or less than the ending value td, the quantity of drained condensed water has reached by this control, the drainage quantity We of condensed water which should be drained. Therefore, the ECU 40 ends the drainage of condensed water and goes to step S50. In step S50, the ECU 40 operates the switching valve 36 to the supply position so as to close the drainage passage 35b. Thereby, the drainage of condensed water to the exhaust passage 11 ends.

According to the present embodiment, while urea water is being supplied to the exhaust passage 11, condensed water stored in the condensed water tank 31 is drained to the exhaust passage 11 via the drainage passage 35b. Due to this, the condensed water drained to the exhaust passage 11 and ammonia existing in the exhaust passage 11 are mixed to be neutralized. Thereby, the pH of the condensed water drained to the exhaust passage 11 rises so that the acidity of the condensed water is reduced. Accordingly, the condensed water reduced in the acidity is drained to the outside of the internal combustion engine 1 through the exhaust passage 11 whereby it is possible to suppress that condensed water having high acidity is drained to the outside of the internal combustion engine 1.

Further, in a case where the storage water quantity qw of urea water is equal to or less than the predetermined value qwt which is set so as to become smaller as the pH of condensed water stored in the condensed water tank 31 is smaller, the increase of urea water quantity is inhibited. As the PH of condensed water is smaller, the acidity becomes higher. Accordingly, the necessity that condensed water is neutralized by increase of urea water quantity is higher. That is, as the PH of condensed water is smaller, it is more preferable to continue, not inhibit, the increase of urea water quantity. However, since supply to the NOx catalyst 12 is the original purpose of use of urea water, when the storage water quantity qw of urea water lowers, the original purpose of use should be prioritized. In consideration of such a situation, in the present embodiment, the predetermined value qwt for inhibiting increase of urea water quantity is set so as to become smaller as the pH of condensed water is smaller. Therefore, it is possible to satisfy the necessity of neutralization of the condensed water as much as possible while keeping the original purpose of user of urea water.

The ECU 40 executes the control routines of FIGS. 2 and 3 whereby the ECU 40 functions as a drainage controlling device of the present invention. Further, the ECU 40 executes the steps S44 to S48 of FIG. 3 whereby the ECU 40 functions as an additive quantity increasing device of the present invention.

Second Embodiment

Figure 6:
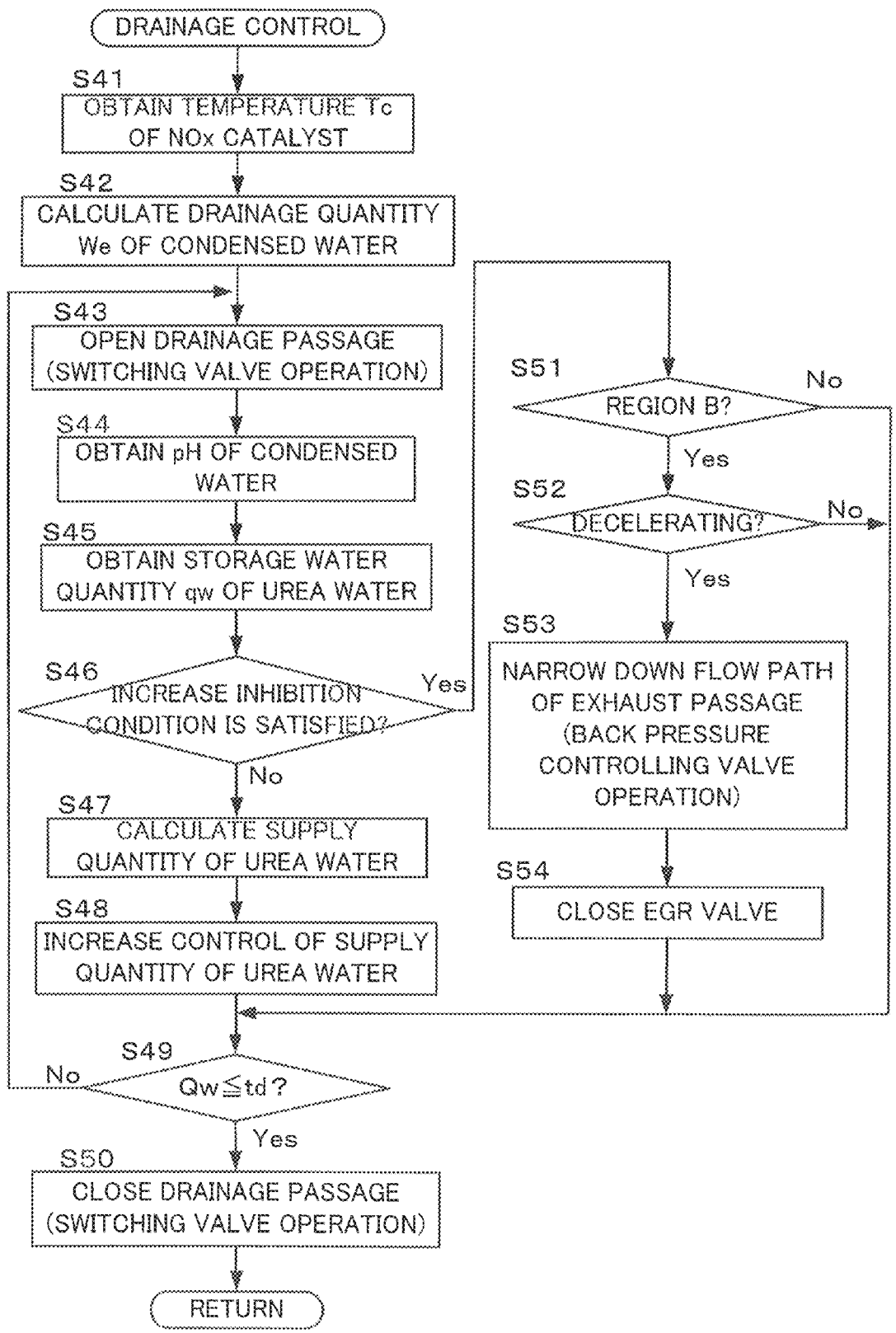
FIG. 6 is a flow chart showing one example of a sub routine of a control routine of a second embodiment.

Next, a second embodiment of the present invention will be explained using FIGS. 6 to 8. The second embodiment corresponds to an embodiment where a part of the drainage control shown in FIG. 3 of the first embodiment is changed. The second embodiment is the same as the first embodiment in the physical configuration. As apparently shown in FIG. 6, the drainage control of the second embodiment corresponds to a control where steps S51 to S54 are added to between the steps S46 to S49 of FIG. 3. The ECU 40 executes the control routine of FIG. 3 and a control routine of FIG. 6 which is a sub-routine of the control routine of FIG. 3. Since the processes except steps S51 to S54 are the same as the ones in the control routine of FIG. 3, the explanations thereof will be omitted.

Figure 7:
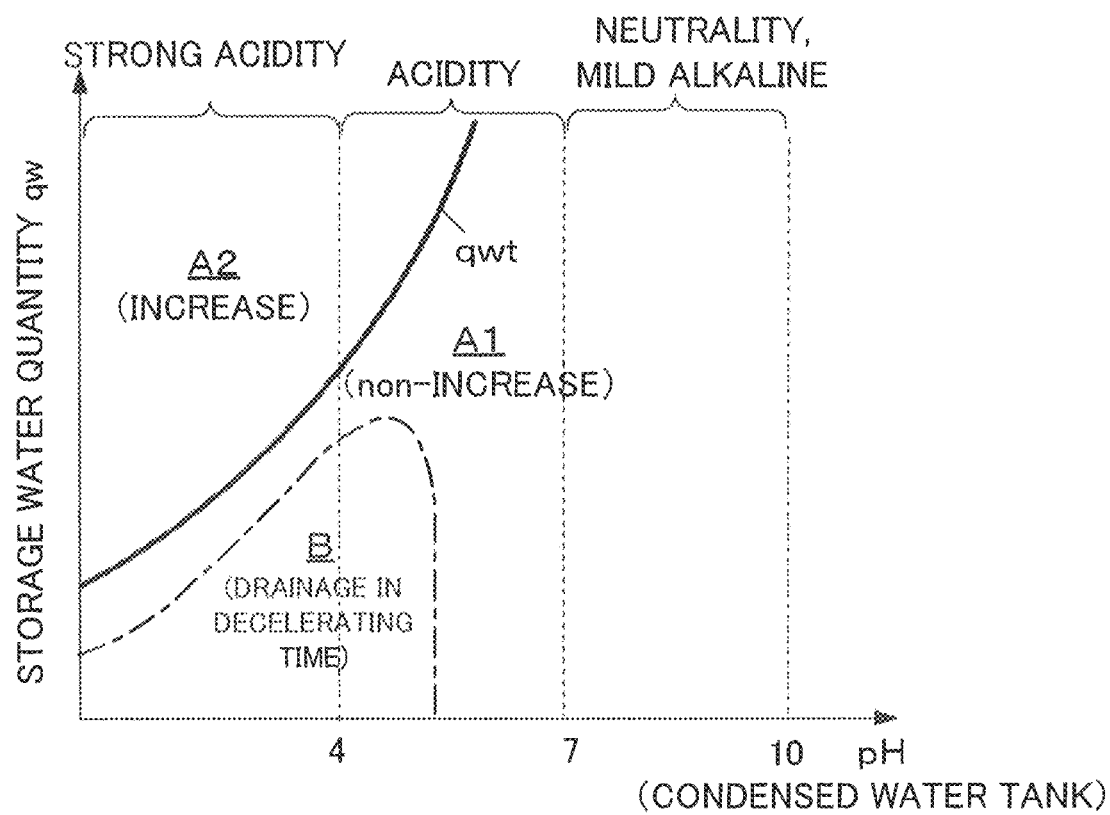
FIG. 7 is a diagram showing a region where drainage of condensed water is executed in time of deceleration.

In step S51, the ECU 40 determines whether the pH of condensed water stored in the condensed water tank 31 and the storage water quantity qw of urea water are included in a region B shown in FIG. 7. The region B is provided within the region A1 where the increase inhibition condition is satisfied, and is surrounded by a dashed line. In the region B, the acidity of condensed water is comparatively high. Due to this, in a case where the increase of urea water quantity is inhibited, there is a possibility that neutralization of the condensed water is not enough. Therefore, it is preferable that the drainage quantity of condensed water which is drained to the outside of the internal combustion engine 1 through the exhaust passage 11 is reduced as much as possible. Then, the ECU 40 reduces the drainage quantity of condensed water which is drained to the outside by executing the processes of steps S52 to S54.

In a case where the pH of condensed water and the storage water quantity qw are included in the region B, the ECU 40 goes to step S52, and otherwise, goes to step S49. In step S52, the ECU 40 determines whether the deceleration of the internal combustion engine 1 is going on. In a case where the deceleration is going on, the ECU 40 goes to step S53, and otherwise, goes to step S49.

In step S53, the ECU 40 operates the back pressure controlling valve 13 so that the flow path of the exhaust passage 11 is narrowed down. Thereby, condensed water is drained in a state that the flow path of the exhaust passage 11 is narrowed down. When the flow path of the exhaust passage 11 is narrowed down, a ratio of condensed water which is taken into the EGR passage 21 increases, the EGR passage 21 being connected at the upstream side of the back pressure controlling valve 13. Accordingly, it is possible to reduce the drainage quantity of condensed water drained to the outside of the internal combustion engine 1 through the exhaust passage 11. Further, in step S54, the ECU 40 closes the EGR valve 23 to close the EGR passage 21.

Figure 8:
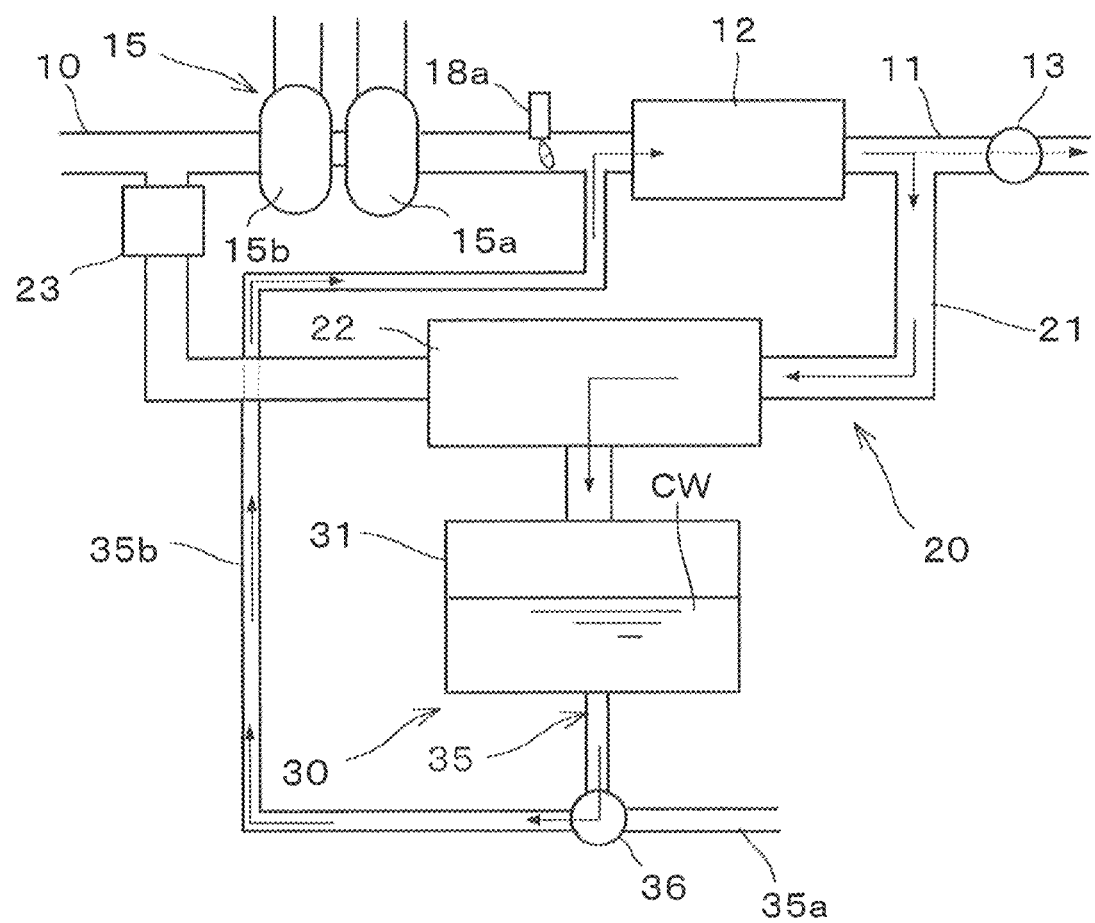
FIG. 8 is a diagram showing an effect obtained in a case where the drainage of condensed water is executed in time of deceleration.

Thereby, as shown in FIG. 8, a part of condensed water drained to the exhaust passage 11 is, as shown by a broken-line arrow, drained to the downstream of the back pressure controlling valve 13, and the remaining condensed water flows following a circulation path shown by a solid-line arrow. That is, this remaining condensed water circulates along this route: the exhaust passage 11→the NOx catalyst 12→the EGR passage 21→the EGR cooler 22→the condensed water tank 31→the drainage passage 35b→the exhaust passage 11. Since condensed water is circulated in this way, it is possible to prevent the condensed water from inflowing into an unexpected path such as the intake passage 10. Due to this, it is possible to prevent generation of corrosion accompanying the inflow of the condensed water. The ECU 40 functions as the drainage controlling device of the present invention by executing the control routines of FIGS. 2 and 6.

The present invention is not limited to the above embodiments, and also can be executed in various embodiments within a subject of the present invention. In the drainage control of the above embodiments, the drainage of condensed water is executed on the premise that urea water is being supplied to the exhaust passage. However, for example, in a case where satisfied is a special condition such as a case that the holding quantity of ammonia in the NOx catalyst is adequate and the supply of urea water is not necessary, it is possible to execute the present invention in such an embodiment that the additive supplying valve is controlled so that urea water is supplied to the exhaust passage in synchronization with the drainage of condensed water.

The connecting position of the drainage passage of condensed water and the exhaust passage is not limited to the embodiment illustrated. As long as urea water is supplied to anywhere of the exhaust passage, the exhaust passage reaches a state that ammonia exists therein. Therefore, aside from efficiency of neutralization of condensed water, condensed water is drained at anywhere of the exhaust passage whereby the neutralization of condensed water is possible. For example, the connecting position of the drainage passage and the exhaust passage can be set on the downstream side of the NOx catalyst.

In each above embodiment, urea water which is a precursor of ammonia is supplied to the exhaust passage. However, this embodiment can be changed to a state that ammonia in a state of gas or a solution is supplied as the additive to the exhaust passage.

In the above embodiments, by supplying condensed water to the intake system of the internal combustion engine, the condensed water is used for, for example, reducing the generation quantity of NOx. However, the supply of condensed water to the internal combustion engine is dispensable. That is, the present invention can be executed even in an embodiment that condensed water stored in a condensed water tank is not used for combustion of an internal combustion engine. The internal combustion engine 1 of each embodiment is configured as a diesel engine. However, an engine which the present invention can be applied to is not limited to a diesel engine. Accordingly, the present invention can be applied to a spark ignition type combustion engine.

The invention claimed is:

1. A condensed water treatment device for an internal combustion engine, the condensed water treatment device being applied to the internal combustion engine comprising: a selective-reduction type NOx catalyst which is provided on an exhaust passage to reduce NOx and purify exhaust gas by ammonia; and an additive supplying valve which supplies an additive which is ammonia or a precursor of ammonia to the exhaust passage at an upstream side of the NOx catalyst, the condensed water treatment device comprising:
   a condensed water tank which stores condensed water generated in an exhaust system of the internal combustion engine;
   a drainage passage which connects the condensed water tank and the exhaust passage;
   a switching valve which switches a state of the drainage passage between close and open; and
   a computer, by executing a computer program, functioning as a drainage controlling device which is configured to control the switching valve, so that the condensed water is drained to the exhaust passage via the drainage passage while the additive is being supplied to the exhaust passage via the additive supplying valve, wherein
   the drainage controlling device is configured to:
      obtain a storage water quantity of the condensed water tank;
      determine whether the storage water quantity obtained is larger than a predetermined threshold value; and
      in a case of determining that the storage water quantity is larger than the predetermined threshold value, control the switching valve so that the drainage passage is opened when the additive is supplied to the exhaust passage.

2. The condensed water treatment device according to claim 1, wherein
   a connecting position where the drainage passage and the exhaust passage are connected with each other is positioned at a downstream side of the additive supplying valve.

3. The condensed water treatment device according to claim 1,
   a connecting position where the drainage passage and the exhaust passage are connected with each other is positioned at an upstream side of the NOx catalyst,
   the drainage controlling device, which the computer by executing the computer program functions as, is configured to calculate a drainage quantity of the condensed water according to temperature of the NOx catalyst.

4. The condensed water treatment device according to claim 3, wherein
the drainage controlling device, which the computer by executing the computer program functions as, is configured to calculate the drainage quantity within a limitation which does not exceed an upper limit set so as to become larger as the temperature of the NOx catalyst is higher.

5. The condensed water treatment device according to claim 1, wherein
the computer, by executing the computer program, further functions as an additive quantity increasing device which is configured to increase supply quantity of the additive to the exhaust passage so that the supply quantity of the additive to the exhaust passage increases more in drainage time of the condensed water to the exhaust passage in comparison with the supply quantity in non-drainage time of the condensed water to the exhaust passage.

6. The condensed water treatment device according to claim 5, wherein
the additive quantity increasing device, which the computer by executing the computer program functions as, is configured to increase the supply quantity of the additive based on drainage quantity of the condensed water drained to the exhaust passage and pH of the condensed water stored in the condensed water tank.

7. The condensed water treatment device according to claim 5, further comprising an additive holding portion which is connected to the additive supplying valve to hold the additive, wherein
the additive quantity increasing device, which the computer by executing the computer program functions as, is configured to inhibit increase of supply quantity of the additive in a case where holding quantity of the additive in the additive holding position is equal to, or less than a predetermined value, and
the predetermined value is set so as to become smaller as pH of the condensed water stored in the condensed water tank is smaller.

8. The condensed water treatment device according to claim 7, wherein
the internal combustion engine further comprises:
an EGR passage which takes out exhaust gas from the exhaust passage at a downstream of the NOx catalyst and leads the exhaust gas to an intake system;
an EGR cooler which is provided on the EGR passage; and
a back pressure controlling valve which is provided at a downstream side of a connecting position where the drainage passage and the exhaust passage are connected with each other and also at a downstream side of a position where the EGR passage takes out the exhaust gas, and is capable of narrowing down a flow path of the exhaust passage, wherein
the condensed water tank stores condensed water generated in the EGR cooler, as the condensed water generated in the exhaust system, and
the drainage controlling device, which the computer by executing the computer program functions as, is configured to operate the back pressure controlling valve so that the condensed water is drained to the exhaust passage in a state that the flow path of the exhaust passage is narrowed down, in a case where the increase of the supply quantity of the additive is inhibited.

9. The condensed water treatment device according to claim 8, wherein
the internal combustion engine further comprises an EGR valve provided on the EGR passage, and
the drainage controlling device, which the computer by executing the computer program functions as, is configured to operate the EGR valve so that the EGR passage is closed.

* * * * *